United States Patent [19]

Maccari, Sr.

[11] 4,359,232
[45] Nov. 16, 1982

[54] MUD FLAP BRACKETS FOR TRUCKS, TRACTORS, TRAILERS AND THE LIKE

[76] Inventor: Arthur Maccari, Sr., 1311 Church St., Philadelphia, Pa. 19124

[21] Appl. No.: 224,219

[22] Filed: Jan. 12, 1981

[51] Int. Cl.³ .............................................. B62D 25/16
[52] U.S. Cl. ........................... 280/154.5 R; 248/289.3
[58] Field of Search .................. 280/154.5 R, 154.5 A, 280/152 R; 248/289.3

[56] References Cited

U.S. PATENT DOCUMENTS

| | | | |
|---|---|---|---|
| 2,652,266 | 9/1953 | Miller | 280/154.5 R |
| 3,224,791 | 12/1965 | Sogoian | 280/154.5 R |
| 3,237,963 | 3/1966 | Menzer | 280/154.5 R |
| 3,244,432 | 4/1966 | Ambli | 280/154.5 R |
| 3,333,868 | 8/1967 | Sogoian | 280/154.5 R |
| 3,473,825 | 10/1969 | Ochs | 280/154.5 R |
| 3,830,520 | 8/1974 | Kelly | 280/154.5 R |
| 3,954,281 | 5/1976 | Juergens | 280/154.5 R |
| 4,180,230 | 12/1979 | Sogoian | 280/154.5 R |

Primary Examiner—Duane A. Reger
Assistant Examiner—Donald W. Underwood
Attorney, Agent, or Firm—Zachary T. Wobensmith, 2nd; Zachary T. Wobensmith, III

[57] ABSTRACT

Flexible mud flap brackets are provided for use on trucks, tractors or trailers which are mounted to extend out from the frame, in back of the wheels and include an outer end portion that can be deformed and returned to normal position without damage to the bracket or the mud flap.

4 Claims, 5 Drawing Figures

U.S. Patent     Nov. 16, 1982     4,359,232
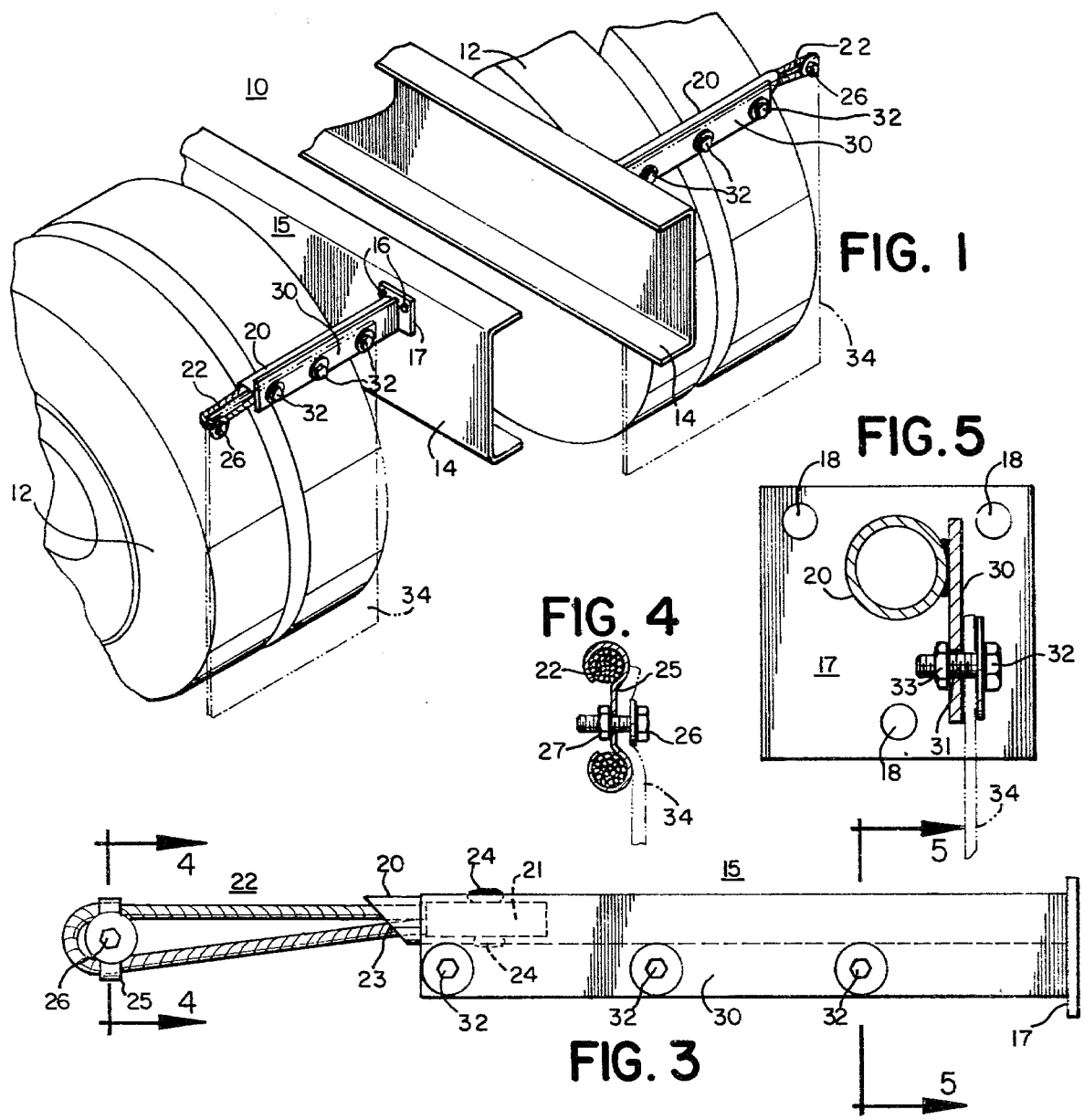
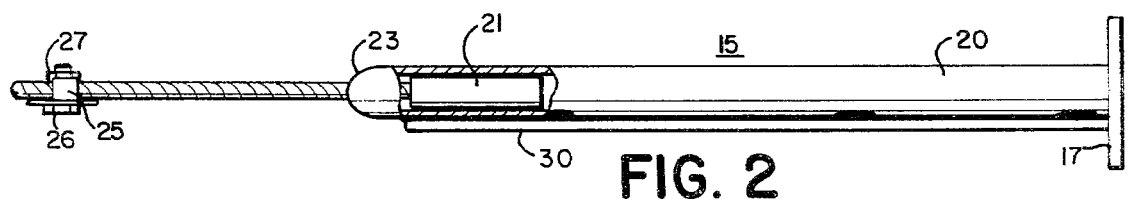

MUD FLAP BRACKETS FOR TRUCKS, TRACTORS, TRAILERS AND THE LIKE

BACKGROUND OF THE INVENTION

1. Field of the Invention

This invention relates to a flexible mud flap bracket bolted to a truck, tractor, or trailer frame adjacent the wheels thereof and supports a mud flap therefrom.

2. Description of the Prior Art

It is a requirement of most motor vehicle codes that trucks, tractors, and trailers be provided with mud flaps to restrict the rearward travel of mud, stones and other debris that is thrown up by the wheels of the vehicle.

The debris is thrown from the wheels with great force, requiring that the mud flaps and their supports be sturdy, and space limitation requires that the brackets be as unobtrusive as is practicable and capable of mounting in different positions for different vehicles. The outer side portions of the flaps and the outer ends of the brackets are subjected to particular abuse from debris and also from contact with loading docks and other hazards with the result that the flaps and brackets are often torn off on the outer edges resulting in loss of effectiveness and consequent repair expense.

Various brackets and mud flaps have been proposed none of which has provided a satisfactory solution to these problems.

The U.S. Patent to Menzer, No. 3,237,963, illustrates a mud flap of composite construction which includes at least one fiberglass sheet which is suspended from a rigid bracket mounted to and extending along a portion of the vehicle body, and which suffers from the shortcomings referred to above.

The U.S. Patent to Ambli, No. 3,244,432, shows a mud flap frame which includes a length of wire that is mounted to the vehicle body at the same points as the flap, and extends along, down and around the flap. The Ambli structure is susceptible to breakage, does not provide a flexible outer flap portion as desired and suffers from the shortcomings referred to above.

The U.S. Patent to Sogoian, No. 3,333,868, illustrates a mud flap support that includes a rigid bracket fastened to and extending along a portion of the vehicle frame with a flap engaged by spring clips from the bracket and supported by cables. The Sogoian structure does not provide the deformable outer end desired, requires attachment directly to the vehicle frame and suffers from the shortcomings referred to above.

The U.S. Patent to Ochs, No. 3,473,825, illustrates a wheel flap which is made up of spaced plate-like members that are attached to the vehicle frame, extend down with a cross bracket mounted thereto, a mud flap is bolted to the spaced members and the cross bracket permitting vertical adjustment of the flap from the road surface. The flap is described as made of flexible material. The Ochs structure does not provide adequate support to the mud flap, requires the members to be mounted to and extend along the vehicle frame and suffers from the shortcomings referred to above.

The U.S. Patent to Kelly, No. 3,830,520, illustrates a combined mud flap and stabilizer which includes a mud flap secured to and extending along a portion of the frame of the vehicle with a U-shaped stabilizer engaged therewith of flexible U-shaped stranded steel cable. The Kelly structure requires mounting to the vehicle frame which restricts the location of the flaps and does not provide flexibility of the outer portion of the flap as well as suffering from the shortcomings referred to above.

The bracket of my invention can be used with conventional mud flaps, can be mounted in a variety of locations and does not suffer from the shortcomings of the previously available structures.

SUMMARY OF THE INVENTION

A flexible mud flap bracket for trucks and the like is provided with a rigid support for a mud flap which support can be mounted to a vehicle frame and with an outer end that can be deformed and readily returns to normal without damage to the flap or bracket.

The principal object of the invention is to provide a flexible mud flap bracket that is sturdy, easy to mount, and enjoys a long service life.

A further object of the invention is to provide a bracket of the character aforesaid which can be used with a variety of trucks, tractors and trailers.

A further object of the invention is to provide a bracket of the character aforesaid that can be easily removed and replaced.

Other objects and advantageous features of the invention will be apparent from the description and claims.

DESCRIPTION OF THE DRAWINGS

The nature and characteristic features of the invention will be more readily understood from the following description taken in connection with the accompanying drawings forming part hereof in which:

FIG. 1 is a view in perspective of a pair of mud flap brackets in accordance with the invention in place on a vehicle;

FIG. 2 is a top plan view, enlarged, and partially broken away of one of the brackets shown in FIG. 1;

FIG. 3 is a front elevational view of the bracket shown in FIG. 1;

FIG. 4 is a fragmentary vertical sectional view taken approximately on the line 4—4 of FIG. 3; and FIG. 5 is a fragmentary vertical sectional view, enlarged, taken approximately on the line 5—5 of FIG. 3.

It should, of course, be understood that the description and drawings herein are illustrative merely and that various modifications and changes can be made in the structure disclosed without departing from the spirit of the invention.

Like numerals refer to like parts throughout the several views.

DESCRIPTION OF THE PREFERRED EMBODIMENT

Referring now more particularly to the drawings in FIG. 1 is illustrated a portion of a vehicle 10 which can be a truck, trailer, or other vehicle, and which includes pairs of rear wheels 12 and longitudinal frame members 14 extending between the wheels 12 and illustrated as channel shaped in cross section.

Each frame member 14, above or at a higher elevation than the respective pairs of wheels 12 is shown with a bracket 15 mounted thereto by bolts 16. The bolts 16 are engaged with a plate 17 which is of rectangular shape with three bolts 16 extending through their respective holes 18 into frame member 14 with nuts (not shown) engaged therewith.

A hollow tube 20 is provided fastened to plate 17, preferably by welding, which extends outwardly from the frame members 14 and transverse to a pair of wheels 12. The tube 20 is open at its outer end and has a loop of flexible stranded cable 22 engaged in a diecast 21 and held in tube 20 by welding at locations 24 of the tube 20. The cable loop 22 extends out and back into the tube 20 at a portion 23 which is beveled or cut off at an angle to the tube 20 to permit downward movement of the cable loop 22 and restrict upward movement.

The cable loop 22 can be of 7/16 inch diameter and has a metal plate 25 engaged therewith transversely with a bolt 26 and nut 27 engaged in the plate 25.

A bar 30 is provided connected to the plate 17 and to the tube 20, preferably by welding, and the bar 30 extends outwardly to adjacent the end of the tube 20. The bar 30 is provided with holes 31 therein for the reception of bolts 32 and nuts 33 which are engaged with a flap 34 of conventional type and shown in phantom. The flap 34 is also engaged with the bolt 26 in the cable loop 22.

In use the plate 17 of bracket 15 is mounted at the desired location on frame member 14 and with a flap 34 hanging from the bar 30 and cable 22. Should the cable loop 22 and flap 34 attached thereto be contacted the loop 22 moves back away from the wheels 12 without permanent deformation until the obstacle is past and then returns to normal condition while providing proper vertical support to the flap 34. It should be noted that the plate 17, tube 20 and bar 30 can be formed of mild steel and welded into a single unit.

It will thus be seen that a structure has been provided with which the objects of the invention are achieved.

I claim:
1. A mud flap bracket for mounting to the frame of a vehicle for attachment of a mud flap which comprises
   a plate member secured to said frame,
   a bar extending perpendicularly from said plate member and detachably carrying said mud flap,
   a mounting member extending from said plate member in parallel relation to said bar,
   said mounting member is hollow and extends outwardly beyond said bar,
   said flexible member is a loop of cable secured in said mounting member,
   said mounting member is a tube,
   the end of the tube is beveled to permit downward movement of the flexible member, but to restrict upward movement of said flexible member, and
   said mud flap is supported along its top portion by said bar and said flexible member.
2. A mud flap bracket as defined in claim 1 in which said loop of cable is in a vertical plane,
   a plate is provided transverse to said loop, and
   a bolt extends through said plate for attachment of the mud flap.
3. A mud flap bracket as defined in claim 1 in which said plate member, said bar and said mounting member are of metal and are secured together by welding.
4. A mud flap bracket as defined in claim 1 in which said bar, said mounting member and said flexible member extend substantially horizontally.

* * * * *